United States Patent
Gim

(10) Patent No.: US 7,414,672 B2
(45) Date of Patent: Aug. 19, 2008

(54) METHOD AND APPARATUS OF PROCESSING VIDEO SIGNALS

(75) Inventor: Hag Ryang Gim, Buk-gu (KR)

(73) Assignee: LG Electronics Inc., Seoul (KR)

( * ) Notice: Subject to any disclaimer, the term of this patent is extended or adjusted under 35 U.S.C. 154(b) by 872 days.

(21) Appl. No.: 10/400,454

(22) Filed: Mar. 28, 2003

(65) Prior Publication Data

US 2004/0012606 A1    Jan. 22, 2004

(30) Foreign Application Priority Data

Jul. 18, 2002    (KR) .................... 10-2002-0041943

(51) Int. Cl.
H04N 9/67    (2006.01)
(52) U.S. Cl. .................. 348/655; 348/566; 348/555
(58) Field of Classification Search ......... 348/655–658, 348/223.1, 565, 564, 563, 554, 555, 566; H04N 9/67
See application file for complete search history.

(56) References Cited

U.S. PATENT DOCUMENTS

| | | | | |
|---|---|---|---|---|
| 4,810,958 A | * | 3/1989 | Mogi et al. | 702/118 |
| 4,864,391 A | * | 9/1989 | Taguchi | 358/518 |
| 5,146,323 A | * | 9/1992 | Kobori et al. | 358/527 |
| 5,305,094 A | * | 4/1994 | Belmares-Sarabis et al. | 348/651 |
| 5,327,243 A | * | 7/1994 | Maietta et al. | 348/565 |
| 6,204,884 B1 | * | 3/2001 | Lee | 348/555 |
| 6,421,094 B1 | * | 7/2002 | Han | 348/569 |
| 6,552,751 B1 | * | 4/2003 | Shigeta | 348/659 |
| 6,965,400 B1 | * | 11/2005 | Haba et al. | 348/222.1 |

* cited by examiner

Primary Examiner—M. Lee
(74) Attorney, Agent, or Firm—Ked & Associates, LLP

(57) ABSTRACT

A method for processing video signals for a video signal processing apparatus is provided which is capable of processing and displaying a plurality of video signals through different paths. The method includes the steps of standardizing the respective video signals being processed through the different paths, and performing a white balance adjustment on the basis of a specified one of the plurality of video signals.

27 Claims, 5 Drawing Sheets

|  | R | G | B |
|---|---|---|---|
| 255 | 255 → 128 | 255 → 128 | 255 → 128 |
| 254 | 254 | 254 | 254 |
| .... | .... | .... | .... |
| 1 | 1 | 1 | 1 |
| 0 | 0 → 128 | 0 → 128 | 0 → 128 |

METHOD AND APPARATUS OF PROCESSING VIDEO SIGNALS

BACKGROUND OF THE INVENTION

1. Field of the Invention

The invention relates to a method and apparatus of processing video signals.

2. Background of the Related Art

With the development of technology, various kinds of video signals are processed by a single display appliance. However, because these video signals are processed using different procedures, a white balancing state of the respective video signals is different for each type of video signal.

According to related art methods, white balancing has been implemented for each of the respective individual video signals. However, the related art methods have various drawbacks including that the white balancing must be repeated.

SUMMARY OF THE INVENTION

An object of the invention is to solve at least the above problems and/or disadvantages and to provide at least the advantages described hereinafter.

Accordingly, the invention is directed to a method and apparatus of processing video signals that substantially obviate one or more problems due to limitations and disadvantages of the conventional art.

To achieve these objects and other advantages and in accordance with the purpose of the invention, as embodied and broadly described herein, there is provided a method for processing video signals for a video signal processing apparatus, capable of processing and displaying a plurality of video signals through different paths, comprising: a) standardizing the respective video signals being processed through the different paths; and b) if the standardization for the respective video signals is completed, performing a white balance adjustment on the basis of a specified one of the plurality of video signals.

The bias standardization may be performed by: inputting a gray pattern including a white pattern and a black pattern through a path selected among the different paths; if the gray pattern is displayed, changing a minimum value of an RGB lookup table of the video signals to a desired value; after changing the minimum value of the RGB lookup table, varying a bias value of a specified one of the color components constituting the video signal being inputted through the selected path; and if a color corresponding to the specified color component is displayed according to variation of the bias value, setting the value corresponding to the bias value as a varied bias value for the plurality of color components.

The gain standardization may be performed by: if the bias value is determined, changing a maximum value of the RGB lookup table as a desired value; after changing the maximum value of the RGB lookup table, varying gain values of the respective color components; and if a color corresponding to the respective color component is displayed according to variation of the gain value, setting the value corresponding to the gain value as a gain varied value for the plurality of color components.

To achieve these objects and other advantages and in accordance with the purpose of the invention, as embodied and broadly described herein, there is also provided an apparatus for processing video signals, capable of processing and displaying a plurality of video signals through different paths, comprising: a scaler for adjusting a bias or gain of a plurality of color components for the respective video signals inputted through different paths; and a controller for setting a bias value or gain value of the plurality of color components for the respective video signals to standardize the plurality of video signals.

The controller may, for example, receive and display a gray pattern including a white pattern and a black pattern through a path selected among the different paths; after changing a minimum value of the RGB lookup table to a desired value, vary a bias value of a specified one of the plurality of color components constituting the video signal being inputted through the selected path; and if a color corresponding to the specified color components is displayed according to variation of the bias value, set the value corresponding to the varied bias value as a bias value for the plurality of color components.

In addition, the controller, if the bias value is set, after changing a maximum value of the RGB lookup table as a desired value, may vary gain values of the respective color components; and if a color corresponding to the respective color component is displayed according to variation of the gain value every color component, set the value corresponding to the varied gain value as a gain value for the plurality of color components.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Reference will now be made in detail to embodiments of the invention, an example of which is illustrated in the accompanying drawings.

Figure 1:
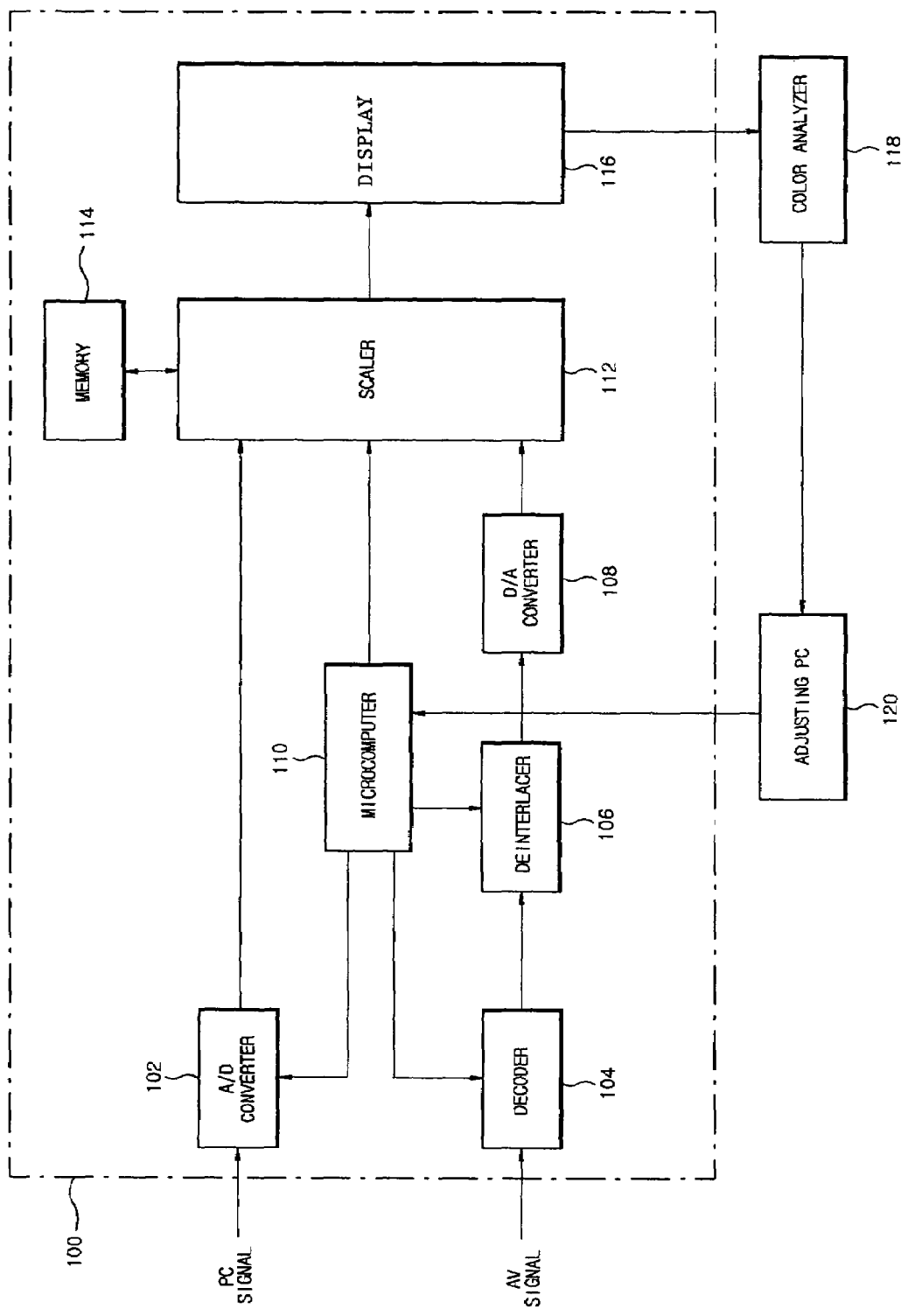
FIG. 1 is a block diagram of a related art video signal processing apparatus.

A related procedure for processing video signals will now be described with reference to FIG. 1. FIG. 1 is a schematic view of a related art video signal processing apparatus.

A signal including various video signals, e.g., a PC signal, is inputted to an A/D converter 102 of a video signal processing apparatus 100. The signal is analog-to-digital converted by the A/D converter 102, and is then applied to a scaler 112.

Another signal including various video signals, e.g., an AV signal, is inputted to a decoder 104 of the video signal processing apparatus 100. The decoder 104 decodes the signal and outputs the result to a deinterlacer 106. The deinterlacer 106 deinterlaces the inputted signal and outputs the deinterlaced signal to a D/A converter 108. The deinterlaced signal is digital-to-analog converted by the D/A converter 108. The microcomputer 110 controls the A/C converter 102, the decoder 110, the deinterlacer 106, and the scaler 112.

The scaler 112 implements white balancing for the inputted signals by referring to several lookup tables (LUT) stored in a memory 114. The signal processed by the scaler 112 is inputted to a display 116, so that the display 116 displays the image corresponding to the inputted signal.

The image displayed on the display 116 is analyzed by a color analyzer 118, and the analyzed result is supplied to an adjusting PC 120. The adjusting PC 120 provides a user with image analyzing information, thereby implementing the inspection of the display appliance and providing an interface between the microcomputer 110 and the user.

As described above, therefore, because the methods of processing the video signals are different from each other for the different video signals, the white balancing state of the respective video signals is also different. This becomes a problem when a number of video images are displayed on one screen through, for example, a picture-in-picture (PIP) function, thereby deteriorating the reliability of the apparatus.

Methods according to an embodiment of the invention are discussed in detail below. The invention may be applied to any type of video signal. However, as a matter of convenience, only a case of processing a PC signal and an AV signal will be described herein. Types of video signals can include primaries (e.g., RGB) or luminance-chrominance transformations or composite or the like.

An embodiment of the invention will now be described with reference to FIG. 2, which is a block diagram of a video signal processing apparatus according to an embodiment of the invention.

Figure 2:
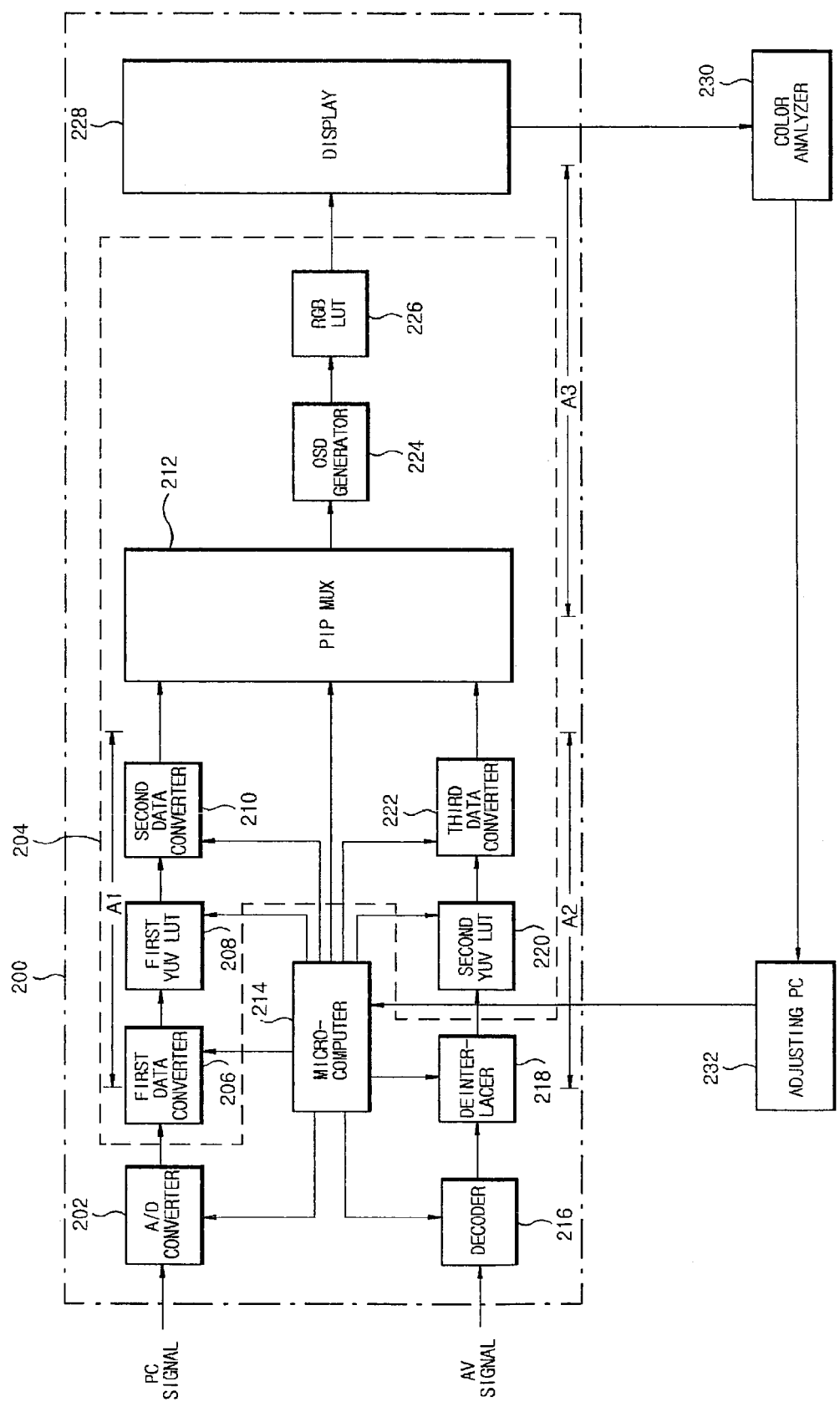
FIG. 2 is block diagram of a video signal processing apparatus according to an embodiment of the invention.

The video signal processing apparatus 200 includes an A/D converter 202, as shown in FIG. 2. The A/D converter 202 receives and converts a PC signal to a digital signal and outputs the A/D converted signal to a scaler 204. The video signal processing apparatus 200 further includes a decoder 216 that receives and decodes an AV signal and outputs the decoded signal to a deinterlacer 218. The deinterlacer 218 deinterlaces the decoded AV signal and outputs the deinterlaced signal to the scaler 204. The scaler 204 can process the PC signal and the AV signal, and also can implement a PIP mixing. An output of the scaler 204 can be supplied to a display 228. A microcomputer 214 can standardize gains and biases of the PC and AV signals according to an embodiment of the invention, as well as control each part of the video signal processing apparatus 200.

The image displayed on the display 228 is analyzed by a color analyzer 230, and the analyzed result is supplied to an adjusting PC 232. The adjusting PC 232 provides a user or the microcomputer 214 with image analyzing information, or provides an interface between the microcomputer 214 and the user.

Describing the construction of the scaler 204 in further detail, the scaler 204 of FIG. 2 includes a first data converter 206 for converting an RGB signal, which is an output of the A/D converter 202, to a YUV signal; a first YUV lookup table (LUT) 208 for adjusting the YUV signal according to values defined in a YUV LUT; and a second data converter 210 for converting the YUV signal, which is an output of the first YUV LUT 208, to a RGB signal. The scaler 204 further includes a second YUV LUT 220 for adjusting the output of the deinterlacer 218 according to values defined in the YUV LUT; and a third data converter 222 for converting the YUV signal, which is the output of the second YUV LUT 220 to the RGB signal. Additionally, the scaler 204 includes a PIP multiplexer 212 for adding the RGB signals outputted from the second and third converters 210 and 222 according to the control of the microcomputer 214; an on-screen display (OSD) generator 224 for adding OSD to the output of the PIP multiplexer 212 according to the control of the microcomputer 214; and an RGB LUT 226 for adjusting the RGB signal, which is the output of the OSD generator 224, according to values defined in an RGB LUT.

As the PC signal passes through the first data converter 206, the first YUV LUT 208, and the second data converter 210 of the scaler 204, a gain value of the PC signal is adjusted. The gain value may be varied according to the control of the microcomputer 214.

As the AV signal passes through the second YUV LUT 220 and the third data converter 222 of the scaler 204, a gain value of the AV signal is adjusted. The gain value may be varied according to the control of the microcomputer 214.

Figure 3:
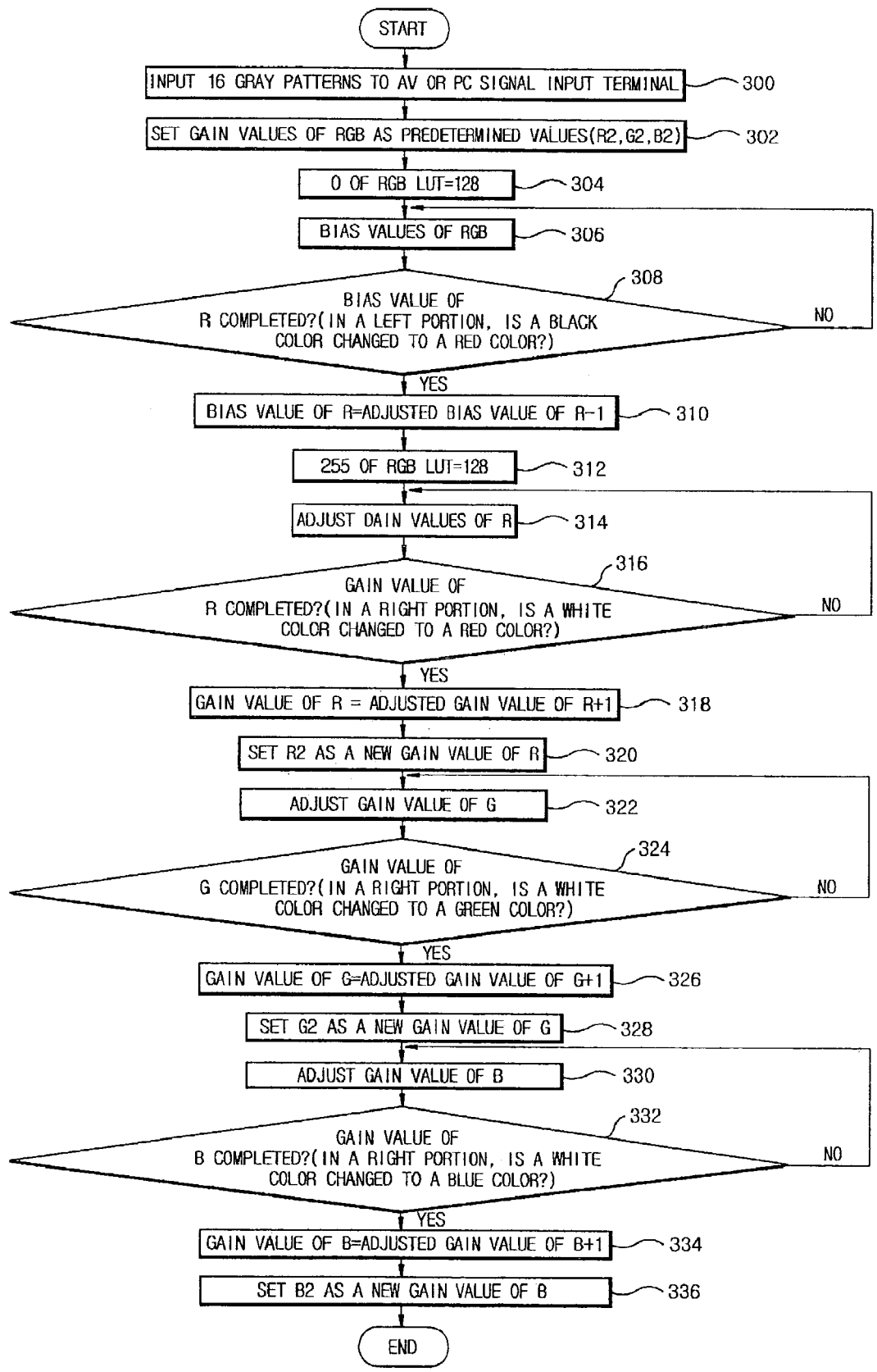
FIG. 3 is a flowchart of a method of processing video signals according to an embodiment of the invention.
Figure 4A:
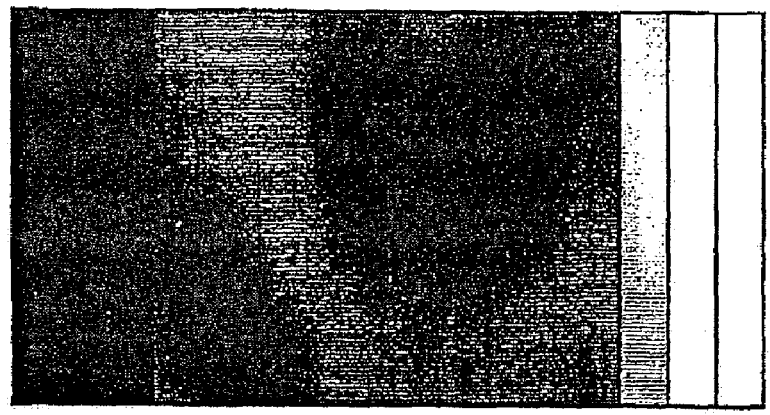
FIGS. 4A to 4D illustrate examples of a screen displayed during a standardizing process according to an embodiment of the invention.
Figure 4B:
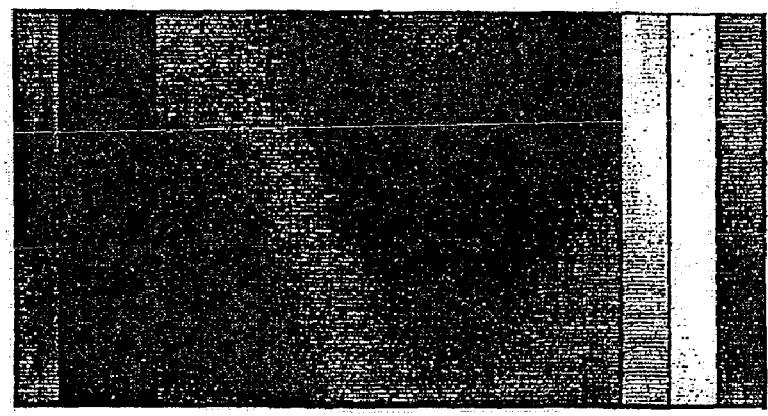
Figure 4C:
Figures 4D, 5:
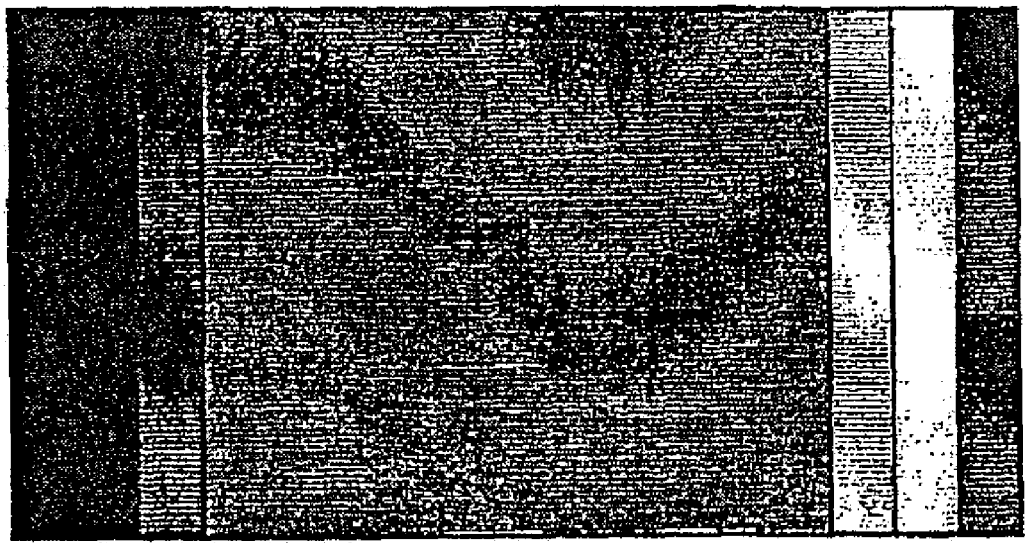
FIG. 5 illustrates an example of values of the lookup table varied during a standardizing process according to an embodiment of the invention.

FIG. 3 is a flowchart of an exemplary method for processing video signals according to an embodiment of the invention. FIGS. 4A to 4D illustrate examples of a screen displayed during the processing according to an embodiment of the invention. FIG. 5 illustrates an example of values of a lookup table according to an embodiment of the invention.

The exemplary method of processing video signals according to an embodiment of the invention may be employed in a video signal processing apparatus, such as that shown in FIG. 2, and will be discussed below in detail with reference to FIGS. 3 to 5.

A user inputs a plurality of gray patterns (e.g., 16) to any one of an AV signal input terminal and a PC signal input terminal, in step S300. The display 228 displays 16 gray patterns, as shown in FIG. 4A. That is, the screen is divided into 16 regions preferably extending in a vertical direction. The regions are allocated with gray patterns which are gradually lightened, for example, from the left to the right. Among the 16 regions, the left end is allocated with a black pattern, and the right end is allocated with a white pattern. Upon display of the 16 gray patterns, the microcomputer 214 then sets the RGB gain values as predetermined gain values R2, G2 and B2, in step S302.

After the gain values of the RGB signal are set as the predetermined gain values R2, G2 and B2, the microcomputer changes a level 0 of the RGB LUT 226 to a level 128, in step S304. Accordingly, the color of the region positioned at the left end is changed to a gray color. An example of the screen displayed as such is shown in FIG. 4B.

Next, the microcomputer 214 reduces a bias value of the R signal, in step S306, and the adjusting PC 232 searches whether or not the adjusting of the bias value of the R signal has been completed, in step S308. After the 16 gray patterns are displayed, the microcomputer 214 changes the level of the RGB LUT 226 from 0 to 128 to reduce the bias value of the R signal. Therefore, the left portion of the screen which is initially displayed in the black color is changed to the gray color, and then the gray color is again changed to a red color. An example of the screen displayed as such is shown in FIGS. 4C and 4D.

The color analyzer 230 detects when the gray color is changed to the red color in the left portion of the screen, and notifies the adjusting PC 232 of the color change. The adjusting PC 232 notifies the microcomputer 214 of the adjusting completion of the bias value of the R signal.

When the adjusting PC 232 notifies the microcomputer 214 of the adjusting completion of the bias value of the R signal, the microcomputer assigns an inferior or lower value to the adjusted bias value of the R signal as the bias values of the RGB signal, in step S310. Since bias values of the RGB signal are identical to each other, only any one of the signals needs to be adjusted. The reason a value inferior or lower than the adjusted bias value of the R signal is preferably set as the bias value of the RGB signal can be that a changing time is when a level 0 is changed to a level 1.

When the bias value of the RGB signal has been set, the microcomputer 214 changes a level 255 of the RGB LUT 226 to a level 128, in step S312, thereby changing the color of the region positioned at the right end of the screen to the gray color. Next, the microcomputer 214 reduces a gain value of the R signal, in step S314, and the adjusting PC 232 searches whether or not the adjusting of the gain value of the R signal has been completed, in step S316. After the 16 gray patterns are displayed, the microcomputer 214 changes the level of the RGB LUT 226 from 255 to 128 to reduce the gain value of the R signal. Therefore, the right portion of the screen which is initially displayed in the white color is changed to the gray color, and then the gray color is again changed to a red color. The color analyzer 230 detects when the gray color is changed to the red color in the right portion of the screen, and notifies the adjusting PC 232 of the color change. The adjusting PC 232 notifies the microcomputer 214 of the adjusting completion of the gain value of the R signal.

If the adjusting PC 232 notifies the microcomputer 214 of the adjusting completion of the gain value of the R signal, the microcomputer sets a superior or higher value to the adjusted gain value of the R signal as the gain value of the R signal, and sets the R2 signal as a newly set gain value of the R signal, in steps S318 and S320.

Next, the microcomputer 214 reduces a gain value of the G signal, in step S322, and the adjusting PC 232 searches whether or not the adjusting of the gain value of the G signal has been completed, in step S324. After the 16 gray patterns are displayed, the microcomputer 214 changes the level of the RGB LUT 226 from 255 to 128 to reduce the gain value of the G signal. Therefore, the right portion of the screen which is initially displayed in the white color is changed to the gray color, and then the gray color is again changed to a green color. The color analyzer 230 detects when the gray color is changed to the green color in the right portion of the screen, and notifies the adjusting PC 232 of the color change. The adjusting PC 232 notifies the microcomputer 214 of the adjusting completion of the gain value of the G signal.

When the adjusting PC 232 notifies the microcomputer 214 of the adjusting completion of the gain value of the G signal, the microcomputer sets a superior or higher value to the adjusted gain value of the G signal as the gain value of the G signal, and sets the G2 signal as a newly set gain value of the G signal, in steps S326 and S328.

Next, the microcomputer 214 reduces a gain value of the B signal, in step S330, and the adjusting PC 232 searches whether or not the adjusting of the gain value of the B signal has been completed, in step S332. After the 16 gray patterns are displayed, the microcomputer 214 changes the level of the RGB LUT 226 from 255 to 128 to reduce the gain value of the B signal. Therefore, the right portion of the screen which is initially displayed in the white color is changed to the gray color, and then the gray color is again changed to a blue color. The color analyzer 230 detects when the gray color is changed to the blue color in the right portion of the screen, and notifies the adjusting PC 232 of the color change. The adjusting PC 232 notifies the microcomputer 214 of the adjusting completion of the gain value of the B signal.

When the adjusting PC 232 notifies the microcomputer 214 of the adjusting completion of the gain value of the B signal, the microcomputer sets a superior or higher value to the adjusted gain value of the B signal as the gain value of the B signal, and sets the B2 signal as a newly set gain value of the B signal, in steps S334 and S336.

As described above, after the standardizing process is completed for any one of the AV signal or the PC signal, another standardizing process for the other signal is again carried out, thereby completing standardization for all of the video signals.

After standardizing the bias and gain for the AV and PC signals, the white balancing adjustment is performed on the basis of the video signal of any path. If all the video signals are standardized, even if the white balancing adjustment is performed on the basis of the video signal of any path, there is no difference in the white balancing state between two signals.

The invention is applicable to various devices, in particular to any device that processes a plurality of video signals and more particularly a plurality of different video signals processed along different paths. For example, the invention is applicable to various types of displays, including but not limited to LCD, PDD, DTV, PDA, PC, microwave displays, and/or any type of multi-window display. Types of video signals can include primaries (e.g., RGB) or luminance-chrominance transformations or composite or the like.

Further, with the above mentioned process according to the invention, which is employable in a video signal processing apparatus capable of receiving and processing a plurality of video signals, there is no difference in the white balancing state between the main- and sub-signals due to standardization of the gain and bias of the plurality of video signals. Therefore, the color for, for example, a PIP or other multi-screen display, is identical to each other, thereby correctly implementing the color or color-temperature desired by a consumer.

Although exemplary methods and apparatus for setting bias and gain were described with respect to FIGS. 2-5, the present invention is not intended to be so limited.

The foregoing embodiments and advantages are merely exemplary and are not to be construed as limiting the invention. The present teaching can be readily applied to other types of apparatuses. The description of the invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method for processing video signals, comprising:
    standardizing, including changing a minimum value of a RGB lookup table of the respective video signals to a desired value, a plurality of video signals being processed through a first path according to a first source of the video signals of a luminance-chrominance type and through a second path according to a second source of the video signals of a RGB type; and
    performing a white balance adjustment on the basis of video signals from the first source and performing a white balance adjustment on the basis of video signals from the second source.

2. The method as claimed in claim 1, wherein standardizing includes:
    inputting a gray pattern including a white pattern and a black pattern through a path selected from the first path or the second path;
    changing the minimum value of a RGB lookup table of the respective video signals to a desired value;

varying a bias value of a specified one of the color components constituting the respective video signal being inputted through the selected path; and if a color corresponding to the specified color component is displayed according to variation of the bias value, setting the value corresponding to the bias value as a varied bias value for the plurality of color components.

3. The method as claimed in claim 1, wherein standardizing the plurality of video signals includes:

changing a maximum value of a RGB lookup table as a desired value;

varying gain values of the respective color components; and if a color corresponding to the respective color component is displayed according to variation of the gain value, setting the value corresponding to the gain value as a varied gain value for the plurality of color components.

4. An apparatus for processing video signals, comprising:

a scaler configured to adjust a bias or a gain of a plurality of color components for a plurality of video signals input through first and second paths and received by the scaler, the scaler including a plurality of data converters configured to adjust a gain value of the plurality of video signals, the adjustment being performed according to a source of each respective video signal of the plurality of video signals; and a controller configured to set a bias value or a gain value of the plurality of color components for the plurality of video signals to standardize the plurality of video signals through the first path and through the second path and receive and display a gray pattern through a path selected among the different paths and vary a bias value with reference to a RGB lookup table of value.

5. The apparatus as claimed in claim 4, wherein the controller is configured to:

receive and display a gray pattern including a white pattern and a black pattern through a path selected among the different paths;

after changing a minimum value of a RGB lookup table to a desired value, vary a bias value of a specified one of the plurality of color components constituting the video signal being inputted through the selected path; and if a color corresponding to the specified color components is displayed according to variation of the bias value, set the value corresponding to the varied bias value as a bias value for the plurality of color components.

6. The apparatus as claimed in claim 5, wherein the controller is configured to:

if the bias value is set, after changing a maximum value of the RGB lookup table as a desired value, vary gain values of the respective color components; and if a color corresponding to the respective color component is displayed according to variation of the gain value every color component, set the value corresponding to the varied gain value as a gain value for the plurality of color components.

7. The apparatus as claimed in claim 4, further comprising a picture-in-picture (PIP) multiplexer configured to add the video signals output by the data converters.

8. The apparatus according to claim 7, further comprising an on-screen display (OSD) generator configured to add an OSD signal to the video signals output by the PIP multiplexer.

9. The apparatus as claimed in claim 5, wherein the scaler comprises first and second pathways for input video signals, wherein the first pathway comprises:

a first data converter configured to convert a first RGB signal of a first input video signal received from an A/D converter to a first YUV signal;

a first YUV look up table (LUT) configured to adjust the first YUV signal by a predetermined value; and a second data converter configured to convert the first YUV signal to a second RGB signal, and wherein the second pathway comprises:

a second YUV LUT configured to adjust a second input video signal received from a deinterlacer by a predetermined value and output the adjusted signal as a second YUV signal; and a third data converter configured to convert the second YUV signal output by the second YUV LUT to a third RGB signal.

10. The apparatus as claimed in claim 9, further comprising a picture-in-picture (PIP) multiplexer configured to add the second and third RGB signals output from the second and third data converters.

11. The apparatus as claimed in claim 10, further comprising an on-screen display (OSD) generator configured to add an OSD signal to the video signals output by the PIP multiplexer.

12. An apparatus for processing video signals, comprising:

standardizing means for standardizing a plurality of video signals being processed through a first path according to a first source and through a second path according to a second source, wherein the standardizing means includes bias or gain standardizing means for standardizing a bias or a gain for color components constituting each of the plurality of video signals; and white balancing means for performing a white balance adjustment on the basis of video signals from the first source and performing a white balance adjustment on the basis of video signals from the second source.

13. The apparatus as claimed in claim 12, wherein the bias or gain standardizing means comprises:

means for inputting a gray pattern including a white pattern and a black pattern through a path selected from the first path or the second path;

means for changing a minimum value of a RGB lookup table of the video signals to a desired value;

means for varying a bias value of a specified one of the color components constituting the respective video signal being inputted through the selected path; and means for, if a color corresponding to the specified color component is displayed according to variation of the bias value, setting the value corresponding to the bias value as a varied bias value for the plurality of color components.

14. The apparatus as claimed in claim 12, wherein the bias or gain standardizing means comprises:

means for changing a maximum value of a RGB lookup table as a desired value;

means for varying values of the respective color components; and means for, if a color corresponding to the respective color component is displayed according to variation of the gain value, setting the value corresponding to the gain value as a varied gain value for the plurality of color components.

15. A method for processing video signals, comprising:

standardizing a plurality of video signals being processed through different paths; and performing a white balance adjustment on the basis of a specified one of the plurality of video signals, wherein standardizing the plurality of video signals being processed through different paths comprises standardizing a bias or gain for color components constituting each of the respective video signals which includes:
inputting a gray pattern including a white pattern and a black pattern through a path selected among the different paths;
changing a minimum value of a RGB lookup table of the respective video signals to a desired value;
varying a bias value of a specified one of the color components constituting the respective video signal being inputted through the selected path; and
if a color corresponding to the specified color component is displayed according to variation of the bias value, setting the value corresponding to the bias value as a varied bias value for the plurality of color components.

16. A method for processing video signals, comprising:
standardizing a plurality of video signals being processed through different paths; and
performing a white balance adjustment on the basis of a specified one of the plurality of video signals, wherein standardizing the plurality of video signals being processed through different paths comprises standardizing a bias or gain for color components constituting each of the respective video signals and further includes:
changing a maximum value of a RGB lookup table as a desired value;
varying gain values of the respective color components; and
if a color corresponding to the respective color component is displayed according to variation of the gain value, setting the value corresponding to the gain value as a varied gain value for the plurality of color components.

17. An apparatus for processing video signals, comprising:
a scaler configured to adjust a bias or gain of a plurality of color components for a plurality of video signals input through different paths; and
a controller configured to set a bias value or gain value of the plurality of color components for the plurality of video signals to standardize the plurality of video signals, wherein the controller is configured to:
receive and display a gray pattern including a white pattern and a black pattern through a path selected among the different paths;
after changing a minimum value of a RGB lookup table to a desired value, vary a bias value of a specified one of the plurality of color components constituting the video signal being inputted through the selected path; and
if a color corresponding to the specified color components is displayed according to variation of the bias value, set the value corresponding to the varied bias value as a bias value for the plurality of color components.

18. The apparatus as claimed in claim 17, wherein the controller is further configured to:
if the bias value is set, after changing a maximum value of the RGB lookup table as a desired value, vary gain values of the respective color components; and
if a color corresponding to the respective color component is displayed according to variation of the gain value every color component, set the value corresponding to the varied gain value as a gain value for the plurality of color components.

19. The apparatus as claimed in claim 17, wherein the scaler comprises a plurality of data converters configured to adjust a gain value of the plurality of video signals.

20. The apparatus as claimed in claim 19, further comprising a picture-in-picture (PIP) multiplexer configured to add the video signals output by the data converters.

21. The apparatus according to claim 20, further comprising an on-screen display (OSD) generator configured to add an OSD signal to the video signals output by the PIP multiplexer.

22. The apparatus as claimed in claim 17, wherein the scaler comprises first and second pathways for input video signals, wherein the first pathway comprises:
a first data converter configured to convert a first RGB signal of a first input video signal received from an A/D converter to a first YUV signal;
a first YUV look up table (LUT) configured to adjust the first YUV signal by a predetermined value; and
a second data converter configured to convert the first YUV signal to a second RGB signal, and wherein the second pathway comprises:
a second YUV LUT configured to adjust a second input video signal received from a deinterlacer by a predetermined value and output it as a second YUV signal; and
a third data converter configured to convert the second YUV signal output by the second YUV LUT to a third RGB signal.

23. The apparatus as claimed in claim 22, further comprising a picture-in-picture (PIP) multiplexer configured to add the second and third RGB signals output from the second and third data converters.

24. The apparatus according to claim 23, further comprising an on-screen display (OSD) generator configured to add an OSD signal to the video signals output by the PIP multiplexer.

25. An apparatus for processing video signals, comprising:
standardizing means for standardizing a plurality of video signals being processed through different paths; and
white balancing means for performing a white balance adjustment on the basis of a specified one of the plurality of video signals, wherein the standardizing means comprises:
bias or gain standardizing means for standardizing a bias or gain for color components constituting each of the plurality of video signals, wherein the bias or gain standardizing means comprises:
means for inputting a gray pattern including a white pattern and a black pattern through a path selected among the different paths;
means for changing a minimum value of an RGB lookup table of the video signals to a desired value;
means for varying a bias value of a specified one of the color components constituting the respective video signal being inputted through the selected path; and
means for, if a color corresponding to the specified color component is displayed according to variation of the bias value, setting the value corresponding to the bias value as a varied bias value for the plurality of color components.

26. An apparatus for processing video signals, comprising:
standardizing means for standardizing a plurality of video signals being processed through different paths; and
white balancing means for performing a white balance adjustment on the basis of a specified one of the plurality of video signals, wherein the standardizing means comprises:
bias or gain standardizing means for standardizing a bias or gain for color components constituting each of the plurality of video signals, wherein the bias or gain standardizing means comprises:
means for changing a maximum value of the RGB lookup table as a desired value;

means for varying gain values of the respective color components; and means for, if a color corresponding to the respective color component is displayed according to variation of the gain value, setting the value corresponding to the gain value as a varied gain value for the plurality of color components.

27. The apparatus as claimed in claim 12, wherein the standardizing means changes a minimum value of a RGB lookup table of the respective video signals to a desired value.

* * * * *